Oct. 10, 1933.　　E. WILSON　　1,929,998

COMPRESSOR OR PUMP

Filed Sept. 1, 1928　　2 Sheets-Sheet 1

Inventor:
Edward Wilson,
by Rippey & Kingsland
His Attorneys.

Oct. 10, 1933.   E. WILSON   1,929,998
COMPRESSOR OR PUMP
Filed Sept. 1, 1928   2 Sheets-Sheet 2
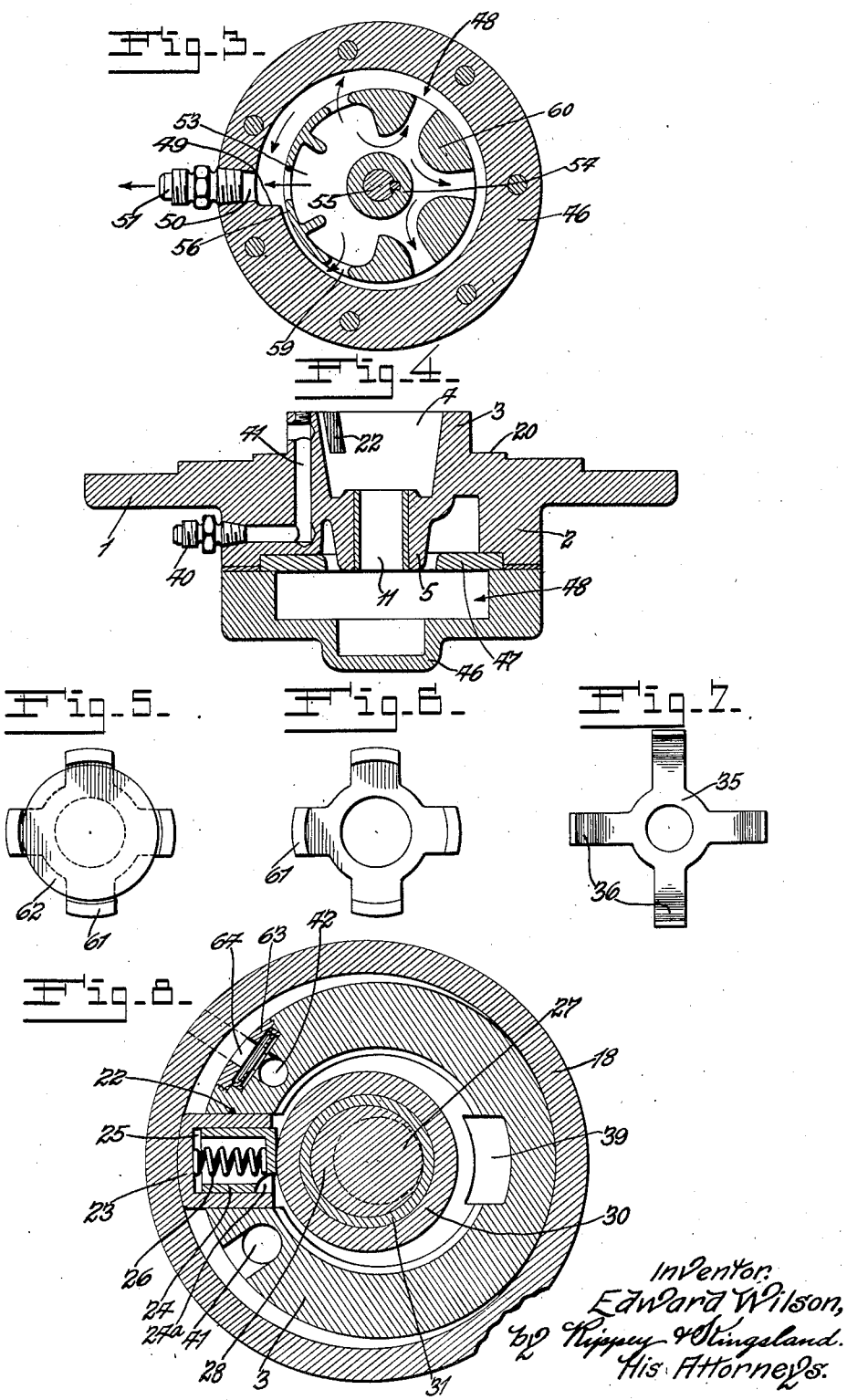

Patented Oct. 10, 1933

1,929,998

UNITED STATES PATENT OFFICE 1,929,998

COMPRESSOR OR PUMP

Edward Wilson, St. Louis, Mo.

Application September 1, 1928. Serial No. 303,400

16 Claims. (Cl. 230—207)

This invention relates to compressors or pumps and, while the embodiment shown is designed specially for use in compression of refrigerant gas, it is capable of useful application to other purposes.

An object of the invention is to provide a machine for use as a compressor or pump and comprising a stationary cylindrical head surrounded by a cylinder which cooperates with the head to form a compression chamber, and having eccentric connection with a shaft whereby the cylinder is operated to perform its intended function, in combination with a pump for circulating a lubricant through the machine and constructed in such a way as to counterbalance the eccentricity of the cylinder and the connection of the cylinder with the shaft.

Another object of the invention is to provide an improvement in the type of compressor or pump disclosed in my companion application filed July 23, 1928, Serial No. 294,727.

Other objects will appear from the following description, reference being made to the drawings in which Fig. 1 is a vertical sectional view of my improved machine.

Fig. 3 is a cross sectional view approximately on the line 3—3 of Fig. 1.

Fig. 4 is a vertical cross sectional view of the stationary head or machine element about which the compression cylinder operates.

Fig. 5 is a plan view of a valve and cage in which the valve is mounted.

Fig. 6 is a plan view of the cage with the valve removed.

Fig. 7 is a plan view of a spring element which may be used to press the cylinder against the stationary head about which the cylinder operates.

Fig. 8 is an enlarged sectional view of the compression mechanism, a part of which is shown in Fig. 2.

Figure 1:
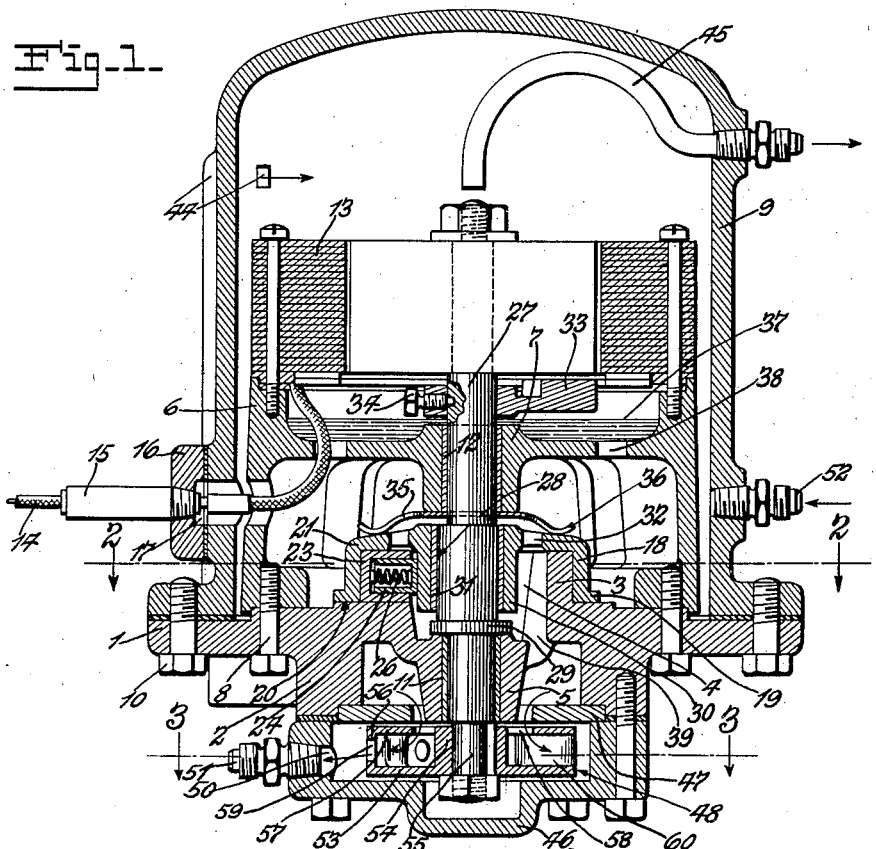

The machine shown comprises a base 1 having an annular depending portion 2 and an upwardly extended portion 3 having a downwardly tapered recess 4 below which a bearing 5 is formed integral with the base 1 within and spaced from the part 2.

A frame, comprising a vertical portion 6 which is preferably circular in cross section and a bearing 7 integrally united with the vertical portion 6, is attached to the base 1 by bolts 8, and is enclosed within a housing 9 fastened to the base 1 by bolts 10. The bearing 7 is in vertical axial alinement with the bearing 5. The bearing 5 is lined by a bushing 11 and the bearing 7 by a bushing 12.

An electric motor 13 is attached to the support 6 within the housing 9, the wires 14 for said motor entering the housing through fittings 15 supported by a removable plate 16 forming a closure for an opening 17 into the housing.

A cylinder 18 is mounted around the head 3 and is operative to compress the air or gas entering the space between the cylinder and the head. The internal diameter of the cylinder is greater than the diameter of the head 3. The lower end 19 of the cylinder 18 operates in close contact with a smooth wall 20 formed on the base 1 and extending radially from the head 3. The upper end of the cylinder 18 has an end wall 21 extending radially toward its axis and operating in close contact with the upper end of the head 3. One side of the head 3 is formed with a wide slot 22 (Fig. 8) extending the full length of the head from the wall 20 to the cylinder wall 21. A plate or blade 23 is mounted for radial sliding movements in said slot.

A cup retainer 24 is mounted for sliding movements in a cylindrical hole 25 in the inner edge of the plate or blade 23 and encloses a spring 26 having one end bearing against the inner end wall of said cup retainer and the opposite end bearing against the bottom of the hole 25 in the plate or blade 23.

A shaft 27 is connected with the motor 13 for rotation thereby, and is journaled for rotation in the bushings 11 and 12. This shaft 27 has an eccentric portion 28 bearing upon a thrust collar 29 supported on the bearing 5. The cylinder 18 has a hub 30 which is concentric with the cylinder. This hub is provided with a bushing 31 mounted on the eccentric 28. These parts should be fitted and assembled in such manner as to permit the shaft 27 and its eccentric 28 to rotate without rotating the hub 30 or the cylinder 18. The eccentric 28 is within the recess 4 and the hub 30 extends downwardly into said recess, which is of sufficient size to permit all the necessary movements of the hub 30 without moving said hub into contact with the wall of said recess. The cylinder end wall 21 has holes 32 therethrough opening into the recess 4 in all positions of the cylinder 18 so as to permit free circulation of oil therethrough.

The inner end of the spring retainer cup 24 abuts against the hub 30 and thereby causes the spring 26 to press the plate or blade 23 outwardly in a radial direction, so that the outer edge of said plate or blade is at all times in contact with the inside of the cylinder 18 throughout the entire length of said cylinder and the head 3. These parts are thoroughly lubricated at all times because of the fact that they are submerged in oil.

Figure 2:
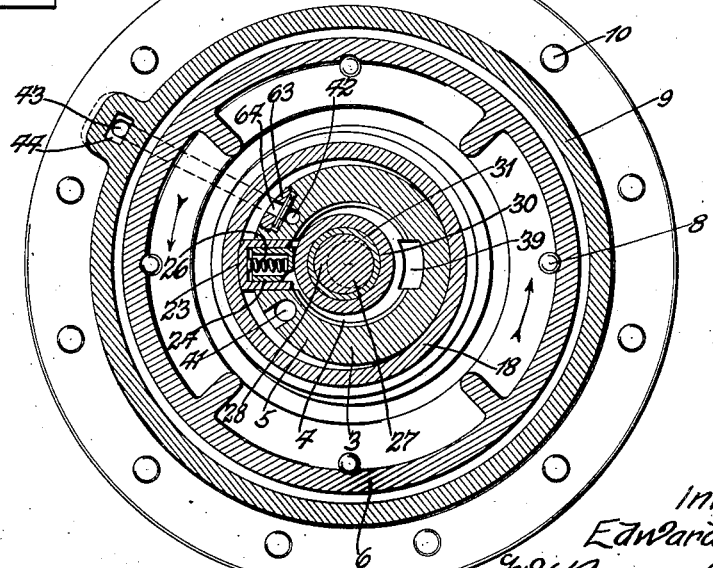
Fig. 2 is a cross sectional view approximately on the line 2—2 of Fig. 1.

By reference to Fig. 2 it will be seen that when the machine is in operation the radial distance from the inner end of the spring retainer cup 24 to the outer edge of the plate or blade 23 remains approximately constant because the radii from the hub 30 to the inner periphery of the cylinder 18 remain constant. That is, the axis of the hub 30 is the axis of the cylinder 18, so that the radial distance from all points around the periphery of the hub to all points of the inner circumference of the cylinder 18 is the same. So, the spring 26 is under an unvarying compression and is not materially varied by expansion or contraction.

In order to counterbalance the eccentric 28 and the cylinder 18 I provide a counterbalance weight 33 which is removably secured on the shaft 27 by a set screw 34. This counterbalance weight, of course, extends oppositely from the eccentric 28 and one of its functions is to maintain the operating mechanism in a balanced condition. Below the bearing 7 is mounted a spring plate 35 having a number of appropriate spring arms 36 bearing against the wall 21 of the cylinder 18. This spring device functions to hold the cylinder 18 yieldingly in cooperative relationship to the head 3.

When the machine is ready for use it contains oil up to about the line 37 (Fig. 1), the oil having free circulation through holes 38 in that part of the frame 6 which supports the bearing 7, through the holes 32 in the cylinder end wall 21 and through a passage 39 in the head 3 and the base 1. In this way all of the operating mechanism including and below the bearing 7 is constantly submerged in oil. The close fitting of the cylinder wall 21 against the upper end of the head 3 and the close fitting of the lower end of the cylinder against the wall 20 prevent oil from passing between said parts into the space between the cylinder 18 and the head 3, but maintain said parts in a lubricated condition.

The air or gas to be compressed or pumped enters the machine from a pipe 40 opening into an angular passage 41 through the annular portion 2 of the base 1 and opening through the periphery of the head 3 near the forward side of the plate or blade 23 (Fig. 2). Near the opposite side of the plate or blade 23 the head 3 is formed with an outlet passage 42 having at its lower end a lateral branch 43 (Fig. 2) communicating through a passage 44 with the inside of the upper portion of the housing 9 above the oil level 37. From the housing 9 compressed air or gas is conducted through a pipe 45 to a condenser (not shown) or elsewhere. Thus the compressed air or gas obtained by operation of the machine is confined in the housing 9 and exerts a downward pressure against the oil in said housing cooperating with the spring 35—36 to hold the cylinder 18 in position in which its lower end is in close contact with the wall 20 and in which its wall 21 is in close contact with the upper end of the head 3. But in case the cylinder 18 becomes overloaded by excess pressure inside said cylinder it is capable of upward movement to provide an opening to relieve the pressure.

A pump housing 46 is attached to the depending annular part 2 of the base, an annular baffle plate 47 being clamped between the end of the part 2 and the pump housing. The wall of the chamber 48 within the pump housing is eccentric, having a shoulder 49 at one side of an outlet 50. A pipe 51 leads from the outlet 50 to a cooler (not shown) and thence through a pipe 52 into the housing 9.

The counterbalance weight 33 is attached to the shaft 27 above the oil so that the oil does not offer any resistance to the rotation of this counterbalance weight 33. Thus, the machine is made to operate more easily than it would if the counterbalance weight were submerged and operated in the oil. This feature of the invention is supplemented by the cooperating counterbalance weight in connection with the shaft 27 beyond the opposite side of the compression mechanism and in the embodiment shown this cooperating counterbalance weight constitutes a part of the oil pump device and is submerged in the oil, although it does not materially increase the resistance.

The combined oil pump and counterbalance device shown comprises an element in the form of a disc 53 having a hub 54 mounted on an elongation 55 of the shaft 27. The disc 53 is formed with an upwardly extended cylindrical wall 56 and with a top wall 57. Thus, the pump element is hollow and oil is admitted to the inside of said element through holes 58 in the top wall 57 and oil is discharged through holes 59 in the cylindrical wall 56. On the side diametrically opposite from the eccentric 28 thickened counter weighting portions 60 are provided in connection with the wall 56 inside the hollow pump element (Fig. 3). It is obvious that when this pump element is rotated rapidly oil will enter said pump element through the holes 58 and be discharged through the holes 59. Because the baffle 47 extends inwardly beyond the vertical plane of the periphery of the pump device the oil which is ejected through the holes 59 is forced to pass through the opening 50 and into and through the pipe 51.

When the machine is ready for use it contains oil to about the line 37 which is below the counterbalance 33. When the motor is started the shaft 27 is rotated with the result that the cylinder 18 is operated in a manner to create suction and compression and the compressed air or gas is forced outwardly through the outlet opening 42. This outlet passage 42 is equipped with a valve comprising a cage 61 confining a valve disc 62 between the cage and a plug 63 having a hole 64 in continuation of the passage 42. The counterbalance 33 partly counterbalances the eccentricity of the cylinder 18 and the counterbalancing parts 30 of the pump device, together with the counterbalance 33, maintains a nearly perfect balance without meeting resistance from the oil.

From the foregoing it must be apparent that this machine is of a simplified construction, highly efficient in its operation, and that a minimum of resistance is encountered. No unusual or difficult manufacturing problems are involved. The operation and function of the machine being now made apparent, I claim and desire to secure by Letters Patent:—

1. A compressor or pump comprising a stationary cylindrical head, a bearing below and a bearing above said head, a shaft extending through said head and journaled for rotation in said bearings, an eccentric on said shaft between said bearings, a cylinder enclosing said head and cooperating therewith to form a compression chamber and operatively connected with said eccentric for operation thereby, an oil pump mounted on and operated by said shaft to force circulation of oil into contact with said bearings and through said cylinder and said head, and a counterbalance weight on said oil pump opposite said eccentric.

2. A compressor or pump comprising a stationary cylindrical head, a bearing below and a bearing above said head, a shaft extending through said head and journaled for rotation in said bearings, an eccentric on said shaft between said bearings, a cylinder enclosing said head and cooperating therewith to form a compression chamber and operatively connected with said eccentric for operation thereby, an oil pump mounted on and operated by said shaft to force circulation of oil into contact with said bearings and through said cylinder and said head, a counterbalance weight on said oil pump opposite said eccentric, and another counterbalance weight in connection with said shaft above the level of the oil.

3. In a compressor or pump, the combination of a stationary cylindrical head, a cylinder enclosing and cooperating with said head to form a compression chamber, a pair of spaced bearings one of which is at each side of said head and both of which are in axial alinement with said head, a shaft journaled for rotation in said bearings, an eccentric on said shaft for operating said cylinder, an oil pump device operated by said shaft for forcing oil into contact with said bearings and through said head and said cylinder, and a counterbalance device in connection with said oil pump opposite said eccentric.

4. A compressor or pump comprising a stationary cylindrical head, a cylinder enclosing and cooperating with said head to form a compression chamber, a shaft extending concentrically through said head and eccentrically through said cylinder, an eccentric on said shaft for operating said cylinder about said head, an oil pump attached to said shaft and operated thereby to cause circulation of oil through said cylinder and said head, and a counterbalance weight in connection with said oil pump for said eccentric and said cylinder.

5. A compressor or pump comprising a stationary cylindrical head, a cylinder enclosing and cooperating with said head to form a compression chamber, a shaft extending concentrically through said head and eccentrically through said cylinder, an eccentric on said shaft for operating said cylinder about said head, an oil pump attached to said shaft and operated thereby to cause circulation of oil through said cylinder and said head, a counterbalance weight in connection with said oil pump for said eccentric and said cylinder, and an additional counterbalance weight in connection with said shaft at the opposite side of said head from said oil pump.

6. A compressor or pump comprising a pair of vertically spaced bearings, a vertical shaft journaled for rotation in said bearings, a stationary cylindrical head between said bearings, a cylinder enclosing and cooperating with said head to form a compression chamber, an eccentric in connection with said shaft for operating said cylinder eccentrically about said head, means for causing circulation of oil through said cylinder and head and into contact with said bearings, and a pair of counterbalance weights on said shaft beyond said bearings respectively extending oppositely from said eccentric.

7. A compressor or pump comprising a pair of spaced bearings, a shaft journaled for rotation in said bearings, a stationary cylindrical head between said bearings, a cylinder enclosing and cooperating with said head to form a compression chamber, an eccentric in connection with said shaft for operating said cylinder eccentrically about said head, a pair of counterbalance weights on said shaft beyond said bearings respectively extending oppositely from said eccentric, and a pump device in connection with one of said counterbalance weights for causing flow of oil through said cylinder and said head and into contact with said bearings.

8. A compressor or pump comprising a stationary cylindrical head, an upper bearing above said head, a lower bearing below said head, a shaft journaled for rotation in said bearings concentrically with said head, a cylinder enclosing and cooperating with said head to form a compression chamber, a pump device attached to said shaft below said lower bearing and operated by said shaft to cause circulation of oil into contact with said bearings and said cylinder, and a counterbalance weight in connection with said pump device extending oppositely from said eccentric.

9. A compressor or pump comprising a stationary cylindrical head, an upper bearing above said head, a lower bearing below said head, a shaft journaled for rotation in said bearings concentrically with said head, a cylinder enclosing and cooperating with said head to form a compression chamber, a pump device attached to said shaft below said lower bearing and operated by said shaft to cause circulation of oil into contact with said bearings and said cylinder, a counterbalance weight in connection with said pump device extending oppositely from said eccentric, and an additional counterbalance weight in connection with said shaft above said upper bearing and above the level of the oil.

10. A compressor or pump comprising a stationary cylindrical head, a cylinder enclosing and cooperating with said head to form a compression chamber, a shaft, a machine for rotating said shaft, an eccentric on said shaft for operating said cylinder eccentrically about said head, an oil pump device attached to said shaft for causing circulation of oil into contact with said cylinder and said shaft, and a counterbalance weight in connection with said oil pump device extending oppositely from said eccentric.

11. A compressor or pump comprising a stationary cylindrical head, a cylinder enclosing and cooperating with said head to form a compression chamber, a shaft, a machine for rotating said shaft, an eccentric on said shaft for operating said cylinder eccentrically about said head, an oil pump device attached to said shaft for causing circulation of oil into contact with said cylinder and said shaft, a counterbalance weight in connection with said oil pump device extending oppositely from said eccentric, and means for confining the pressure generated by operation of said cylinder about said head to press said cylinder to cooperative position with respect to said head.

12. A compressor or pump comprising a stationary cylindrical head, a cylinder enclosing and cooperating with said head to form a compression chamber, a shaft, a machine for rotating said shaft, an eccentric on said shaft for operating said cylinder eccentrically about said head, an oil pump device attached to said shaft for causing circulation of oil into contact with said cylinder and said shaft, a counterbalance weight in connection with said oil pump device extending oppositely from said eccentric, and a device in connection with said shaft yieldingly pressing said cylinder to cooperative position on said head.

13. A compressor or pump comprising a stationary cylindrical head, a pair of spaced bearings, a shaft journaled for rotation in said bearings, an eccentric on said shaft between said bearings, a cylinder enclosing and cooperating with said head to form a compression chamber and operated eccentrically about said head by said eccentric, an oil pump attached to and operated by said shaft to cause movement of oil into contact with said shaft and said cylinder and said bearings, and a counterbalance in connection with said oil pump opposite said eccentric.

14. A compressor or pump comprising a stationary cylindrical head, a pair of spaced bearings, a shaft journaled for rotation in said bearings, an eccentric on said shaft between said bearings, a cylinder enclosing and cooperating with said head to form a compression chamber and operated eccentrically about said head by said eccentric, an oil pump attached to and operated by said shaft to cause movement of oil into contact with said shaft and said cylinder and said bearings, a counterbalance in connection with said oil pump opposite said eccentric, and another counterbalance in connection with said shaft above the level of the oil and cooperating with said first named counterbalance to counterbalance said eccentric and said cylinder.

15. A compressor or pump comprising a cylindrical head, a bearing below and a bearing above said head, a shaft extending through said head and journaled for rotation in said bearings, an eccentric on said shaft between said bearings, a cylinder enclosing said head and cooperating therewith to form a compression chamber and operatively connected with said eccentric for operation thereby, a housing confining a body of oil enveloping said cylinder and said first named bearing, and an oil pump mounted on and operated by said shaft below said bearing that is below said head to force circulation of said oil into contact with said bearings and through said cylinder and said head.

16. A compressor or pump comprising a vertical cylindrical stationary head, a vertical rotary shaft extending axially through said head, a cylinder enclosing and cooperating with said head to form a compression chamber between them and being capable of lateral movements relative to said shaft, a device operated by said shaft for imparting lateral movements to said cylinder with respect to said shaft and to said head to compress air or gas entering said chamber, means for conducting air or gas into said chamber for compression, means for conducting the compressed air or gas from said chamber, a pump housing enclosing the lower end of said shaft and supporting a body of oil extending through said cylinder and said head, and a pump in said housing for forcing circulation of oil therefrom and causing movement of oil through said cylinder and said head.

EDWARD WILSON.